United States Patent [19]
Lee

[11] Patent Number: 6,084,646
[45] Date of Patent: Jul. 4, 2000

[54] CIRCUIT FOR CORRECTING VERTICAL DISTORTION OF DISPLAY DEVICE

[75] Inventor: Seung-Taek Lee, Kyungki-do, Rep. of Korea

[73] Assignee: SamSung Electronics Co, Ltd., Suwon, Rep. of Korea

[21] Appl. No.: 09/084,586

[22] Filed: May 27, 1998

[30] Foreign Application Priority Data

May 27, 1997 [KR] Rep. of Korea ................. 97-20947

[51] Int. Cl.[7] ........................................ H04N 3/22
[52] U.S. Cl. ........................... 348/806; 348/746; 315/370
[58] Field of Search .................................. 348/746, 745, 348/806; 315/370; H01N 3/22

[56] References Cited

U.S. PATENT DOCUMENTS

| 4,673,984 | 6/1987 | Kikuchi . | |
|---|---|---|---|
| 4,814,671 | 3/1989 | Oguino | 315/370 |
| 5,965,990 | 10/1999 | Woo | 348/806 |

*Primary Examiner*—Sherrie Hsia
*Attorney, Agent, or Firm*—Robert E. Bushnell, Esq.

[57] ABSTRACT

A circuit for correcting vertical distortion of a display device is adapted to correct the vertical distortion of the image in the display device employing a large-sized screen and includes: a multi-vibrator for generating a correction signal by overlapping horizontal and vertical pulses provided by horizontal and vertical output circuits, respectively; a buffer for stabilizing the correction signal generated from the multi-vibrator; a vertical sawtooth wave regenerator for regenerating a vertical sawtooth wave in response to the correction signal stabilized through the buffer; and an amplifier for boosting the vertical sawtooth wave according to the correction signal generated by the vertical sawtooth wave regenerator, and for applying it to a vertical deflection yoke.

43 Claims, 5 Drawing Sheets

CIRCUIT FOR CORRECTING VERTICAL DISTORTION OF DISPLAY DEVICE

CLAIM OF PRIORITY

This application makes reference to, incorporates the same herein, and claims all benefits accruing under 35 U.S.C. §119 from my applications entitled CIRCUIT FOR CORRECTING VERTICAL DISTORTION OF DISPLAY DEVICE filed in the Korean Industrial Property Office on May 27, 1997 and there duly assigned Serial No. P97-20947 by that Office.

BACKGROUND OF THE INVENTION

1. Technical Field

The present invention relates to a circuit for correcting vertical distortion of a display device and, more particularly, to a circuit for correcting vertical distortion on a large-sized screen of a display device by use of a minute horizontal pulse.

2. Related Art

With the development of technologies in the fields of electricity, electronics and applications such as multimedia, it is a tendency for the recent display devices to have a large-sized screen in order to display graphic images.

Enlargement of the screen in the display device means that larger screen size is adapted to a cathode ray tube (referred to as a "Braun tube") which is to generate the electron beams in response to video signals and cause them to strike the phosphor coating, creating a picture on the screen. As the screen size of the Braun tube or cathode ray tube (hereinafter, referred to as "CRT") becomes larger, the geometrical structure of the screen is altered in such a manner as to require a deflection capacity of the deflection yoke for deflecting the electron beams across the large screen.

Display monitors have typically been provided with circuitry for correcting vertical distortion in a display device. In such arrangements, a correction signal is fed into a vertical deflection yoke for trouble shooting the vertical distortion on the cathode ray tube (CRT) screen. However, the use of large-sized display devices mentioned above results in a problem. Specifically, it is difficult to have a variable range of a signal sufficient to eliminate vertical distortion in such large-sized display devices because a horizontal post current is overlapped with a vertical post current. I have found, therefore, that there is a need for the development of a circuit for correcting vertical distortion in a display device using a large-sized screen. In particular, there is a need for the development of circuitry for correcting vertical distortion in a display device using a large-sized screen with a minute current by overlapping a low horizontal deflection post current with a vertical post current and applying a resulting post current to a vertical deflection yoke.

SUMMARY OF THE INVENTION

It is, therefore, an object of the present invention to provide an improved process and circuit for correcting vertical distortion.

It is another object to provide a circuit for correcting vertical distortion of a display device using a large-sized screen with a minute current by overlapping a low horizontal deflection pulse with a vertical pulse current and applying the resulting pulse to a vertical deflection yoke.

To achieve these and other advantages and in accordance with the purpose of the present invention, as embodied and broadly described, a circuit for correcting vertical distortion of a display device may be constructed with a multi-vibrator for generating a correction signal by overlapping horizontal and vertical pulses applied from horizontal and vertical output circuits, respectively; a buffer for stabilizing the correction signal generated by the multi-vibrator; a vertical sawtooth wave regenerator for regenerating a vertical sawtooth wave in response to the correction signal stabilized through the buffer; and an amplifier for boosting the vertical sawtooth wave according to the correction signal generated from the vertical sawtooth wave regenerator, and applying it to a vertical deflection yoke.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
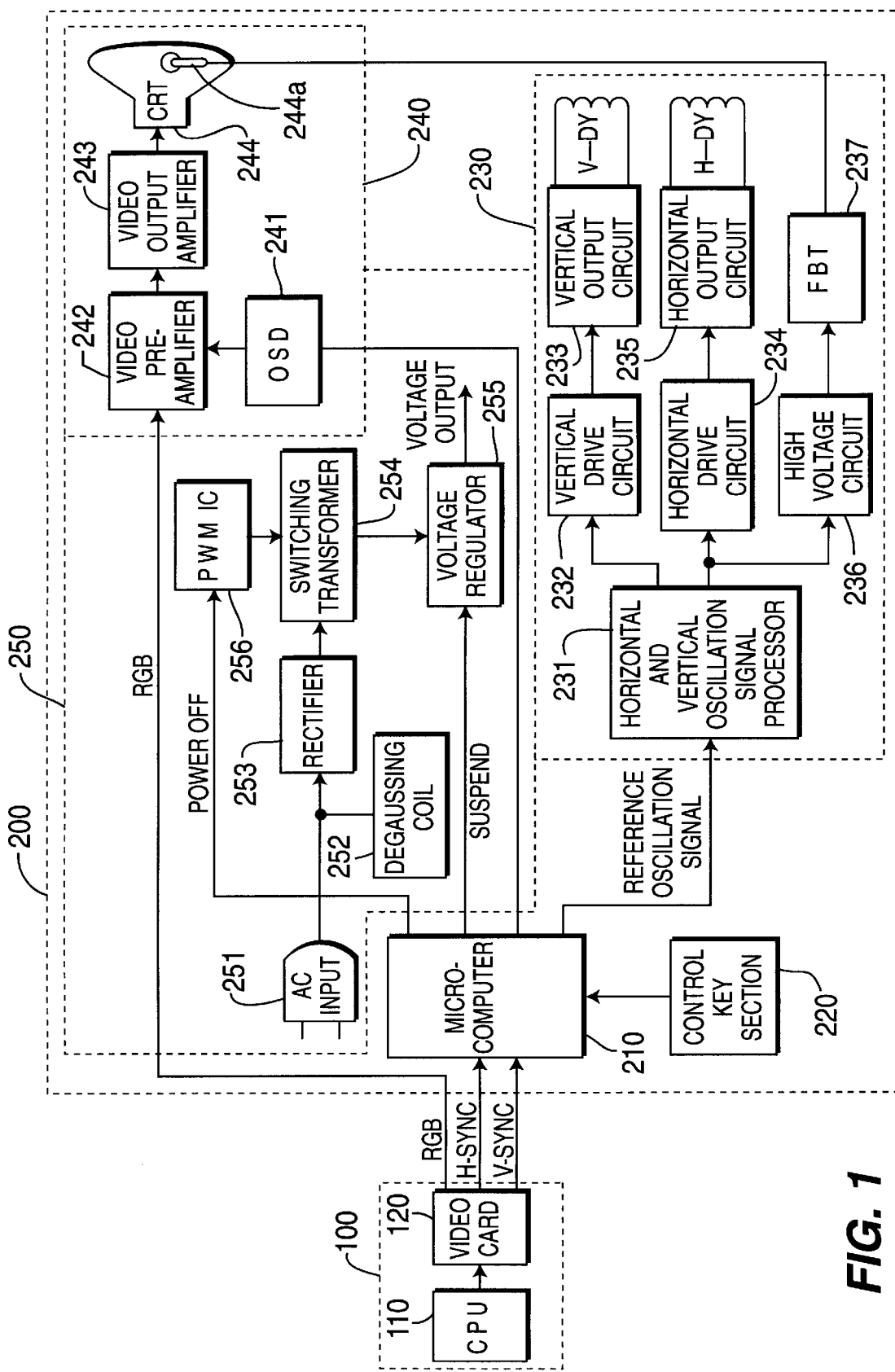
FIG. 1 is a block diagram of the internal circuit of a display monitor.

FIG. 1 is a block diagram showing the internal circuit of a display monitor. As shown in FIG. 1, computer 100 is composed of a CPU 110 for processing a keyboard signal to generate resulting output data, and a video card 120 for processing the output data of the CPU 110 to form R, G and B video signals and further generating horizontal and vertical sync signals H/V-SYNC which are used to synchronize the R, G and B video signals.

Display monitor 200, which is receptive to the R, G and B video signals and the horizontal and vertical sync signals H/V-SYNC received from the video card 120 in the computer 100, is composed of a microcomputer 210 responsive to the horizontal and vertical sync signals H/V-SYNC for discriminating a resolution; a control key section 220 for generating an image adjusting signal to control the screen of the display device; a horizontal and vertical output circuit section 230 responsive to the image adjusting signal and a reference oscillation signal from the microcomputer 210 for synchronizing a raster; a video circuit section 240 for boosting the R, G and B video signals from the video card 120 and displaying them; and a power supply circuit section 250 for supplying a drive voltage to the microcomputer 210, horizontal and vertical output circuit section 230, and video circuit section 240.

Following is a detailed description of the respective blocks in the display monitor 200 discussed above. Horizontal and vertical sync signals H/V-SYNC generated by the video card 120 of the computer 100 are fed into the microcomputer 210 which stores all sorts of screen control data, and the microcomputer 210 generates an image adjusting signal and a reference oscillation signal in response to a screen control signal applied from the control key section 220.

Receiving the image adjusting signal and the reference oscillating signal from the microcomputer 210, a horizontal and vertical oscillating signal processor 231 applies a vertical pulse to a vertical drive circuit 232, wherein the vertical pulse is used to control the switching rate of a sawtooth wave generating circuit in response to the horizontal and vertical sync signals H/V-SYNC received from the video card 120.

As regards vertical drive circuit 232 which is receptive to the vertical pulse, two types are most widely used: a single step vertical amplification type and an emitter follower type. The emitter follower type vertical drive circuit has the base of a transistor therein used as an input and the emitter thereof used as an output. Hence, the vertical drive circuit 232 normally operates to improve the linear characteristic as opposed to the gain.

Such vertical drive circuit 232 supplies a boosted drive current to vertical output circuit 233, which generates a sawtooth current corresponding to the vertical sync pulse flowing through a vertical deflection yoke V-DY and determines a vertical scanning period according to the sawtooth current. In addition, a horizontal drive circuit 234 is receptive to a horizontal oscillating signal generated from the horizontal and vertical oscillation processor 231 and, accordingly, generates a drive current sufficient to turn on/off the horizontal output circuit 235.

Upon receipt of the drive current from the horizontal drive circuit 234, the horizontal output circuit 235 generates a sawtooth current to the horizontal deflection yoke H-DY, determining a horizontal scanning period according to the sawtooth current. Such a horizontal drive circuit 234 may be divided into two classes: an in-phase type wherein the output is turned ON when the drive terminal is ON, and an out-of-phase type wherein the output is OFF with the drive terminal ON.

In order to supply a stable d-c voltage to anode 244a of CRT 244, a high voltage is generated in a high-voltage circuit 236 and an FBT (FlyBack Transformer) 237. That is, even when a collector pulse is very weak, a high voltage can be generated through the high-voltage circuit 236 and FBT 237 making use of a harmonic wave caused by the inductance and distribution capacity. Thus, the generated high voltage is applied to the anode 244a of the CRT 244 so as to form a high voltage across the anodic surface of the CRT 244.

On the other hand, the video circuit section 240 has an OSD (On Screen Display) IC 241 which receives OSD data generated in the microcomputer 210 according to the choice of the user. OSD IC 241 processes the OSD data to generate an OSD gain signal which is provided to a video preamplifier 242.

Video pre-amplifier 242, which has received the OSD gain signal, is supplied with the R, G and B video signals generated in the video card 120. Upon receipt of the OSD gain signal and the R, G and B video signals, the video pre-amplifier 242 is a low voltage amplifier that boosts the R, G and B video signals or the OSD gain signal to a limited voltage level according to the choice of the user.

For example, a signal of less than 1 peak to peak voltage (hereinafter, referred to as $V_{pp}$) is boosted to a signal of 4 to 6 $V_{pp}$. A video output amplifier 243 further boosts the R, G and B video signals or OSD gain signal of 4 to 6 $V_{pp}$ to those of 40 and 60 $V_{pp}$, supplying energy to the respective pixels of the CRT 244 to display an image.

The image displayed according to the R, G and B video signals or the OSD signal through the CRT 244 has its scanning period determined by the horizontal and vertical deflection yokes H-DY and V-DY, and is visually displayed on the screen of the CRT 244. The R, G and B video signals or the OSD signal which have been boosted through the video output amplifier 243 are displayed as a picture with the luminance regulated by the high voltage formed across the anodic surface of CRT 244.

An alternating current (hereinafter, referred to as "AC") is fed into an AC input terminal 251 of the power supplying circuit section 250, which is to provide a drive voltage for displaying the R, G and B video signals on the screen of the display monitor. The AC is further applied to a degaussing coil 252, problem shooting the fuzzy indistinct colors caused by the influence of the earth magnetic field or external environment.

For this, applying an AC to a degaussing coil 252 momentarily for 2 to 8 seconds disperses the magnetic field of a DC component formed across the shadow mask in CRT 244, and thereby prevents the magnetic field from causing unstable deflection of the electron beams.

The AC is normally rectified into DC through a rectifier 253, and is fed into a switching transformer 254 so that the switching transformer 254 supplies all sorts of drive voltages required in the monitor 200 through a voltage regulator 255. In this case, PWM (Pulse Width Modulation) IC 256 controls the switching operation of the switching transformer 254, stabilizing the output voltage of the transformer 254.

Microcomputer 210 is under the control of a DPMS (Display Power Management Signaling) mode which is to economize power consumed in the display monitor 200. In this respect, the microcomputer 210 enters the power-off mode and the suspend mode depending on the presence of horizontal and vertical sync signals H/V-SYNC, and accordingly, saves the power in the display monitor 200.

Figure 2:
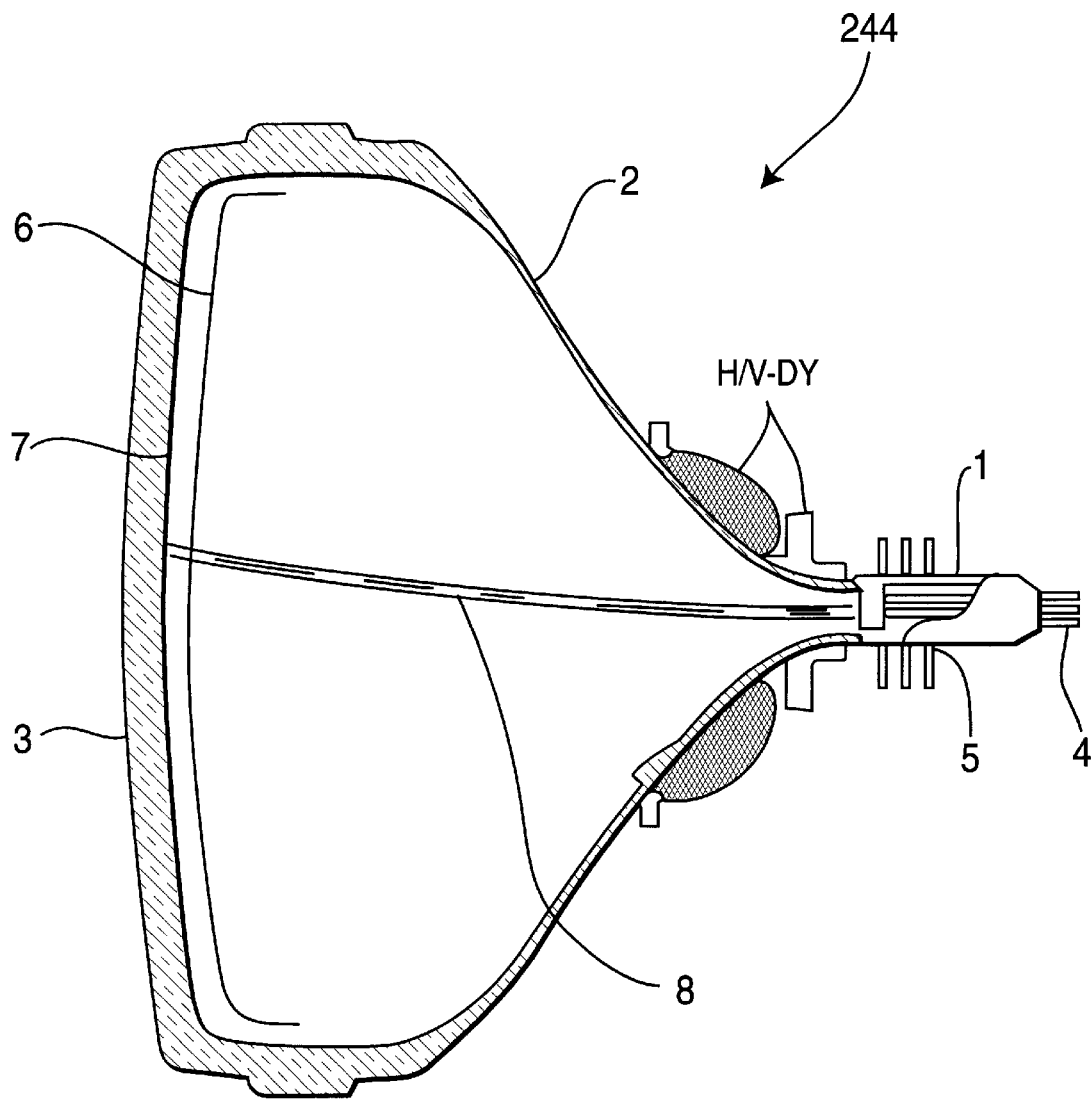
FIG. 2 is a detailed side cross section of the structure of the CRT shown in FIG. 1.

Below is given the structure of the CRT provided in such a display device 200 with reference to the attached FIG. 2, a detailed side cross section of the CRT 244 shown in FIG. 1. As shown in FIG. 2, the CRT 244 is composed of a neck 1, a funnel 2 and a panel 3. The CRT neck 1 has a lead 4 which is located at the rear of the neck 1, and which is receptive to bias voltages in response to the video signals, and built-in electron guns 5 to generate and aim the electron beams B in response to the bias voltages applied thereto through the lead 4.

The direction motion (in this case, the beams B) is determined by the magnetic field generated from horizontal and vertical deflection yokes H/V-DY which are located on the outside of the funnel 2.

The electron beams B deflected by the horizontal and vertical deflection yokes H/V-DY are directed toward phosphor coating 7 through the phosphor dots or stripes that are disposed in a shadow mask 6 built in the panel 3, striking the phosphor and giving off light, so that an image is created.

As the magnetic energy in this case is given constant under the condition of the CRT and the horizontal and vertical deflection yokes H/V-DY, it is needed to adjust the coils of the horizontal and vertical deflection yokes H/V-DY in the case of a large-sized screen. Adjusting the coils of the horizontal and vertical deflection yokes H/V-DY varies the inductance with respect to the current required to deflect the electron beams across a given length of the screen, generating a deflection current for the increased screen size.

Figure 3:
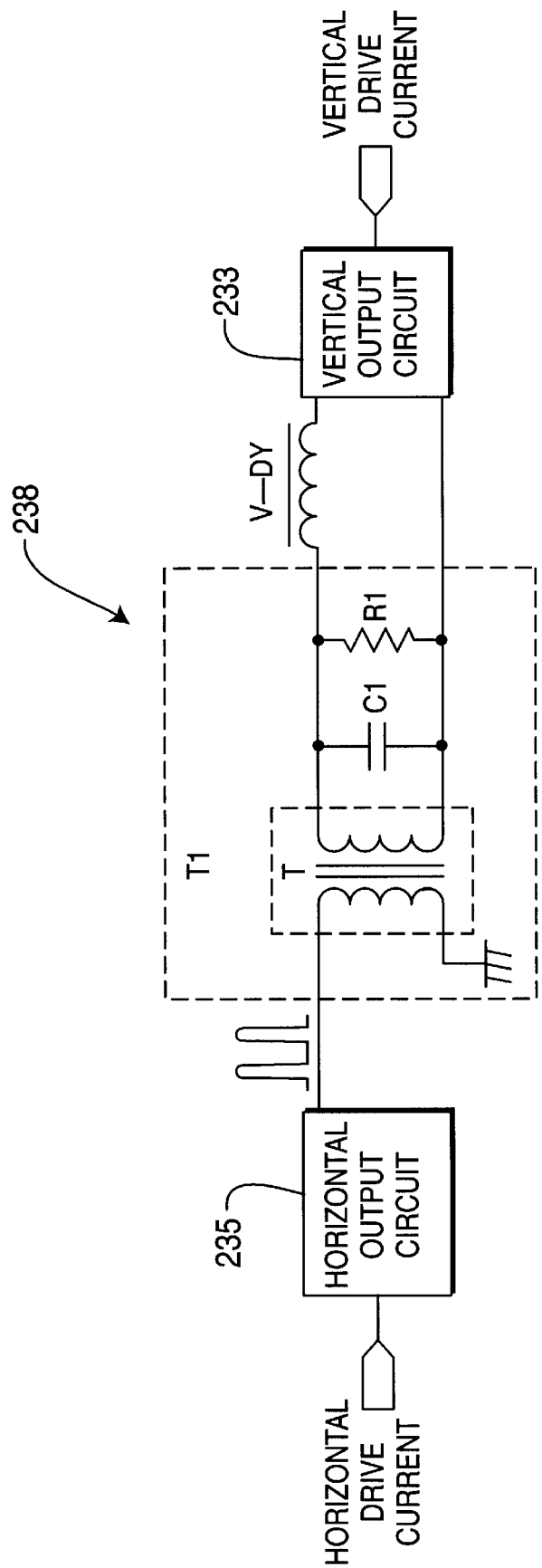
FIG. 3 is a diagram of a circuit for correcting vertical distortion of the display device shown in FIG. 2.

A description of the method for correcting vertical distortion on the CRT screen is given with connection to the attached figure as follows. FIG. 3 is a diagram illustrating a circuit for correcting vertical distortion in the display device shown in FIG. 2, wherein the circuit 238 consists of a horizontal output circuit 235 connected to the primary terminal of transformer T1, and a vertical output circuit 233 connected to the secondary terminal of transformer T1. Below is a description of the operation of such a circuit 238.

The horizontal output circuit 235 is responsive to a horizontal drive current applied from the horizontal drive circuit (reference numeral 234 in FIG. 1), generating a horizontal pulse current. This horizontal pulse current is fed into the primary terminal of the transformer T1 in the circuit 238.

On the other hand, the vertical output circuit 233 is supplied with a vertical drive current from the vertical drive circuit (reference numeral 232 in FIG. 1 ), generating a vertical pulse current. The vertical pulse current is applied to the secondary terminal of the transformer T1 and overlapped to generate a correction signal through the transformer T1.

This correction signal is fed into vertical deflection yoke V-DY for troubleshooting the vertical distortion on the CRT screen. Resistance R1 and capacitor C1, in this case, are to prevent the resonant effect caused in the transformer T1. However, a large-sized display device encounters a problem in that it is hard to have the variable range of the signal sufficient to eliminate the vertical distortion because the horizontal pulse current as unturned is overlapped with the vertical pulse.

Figure 4:
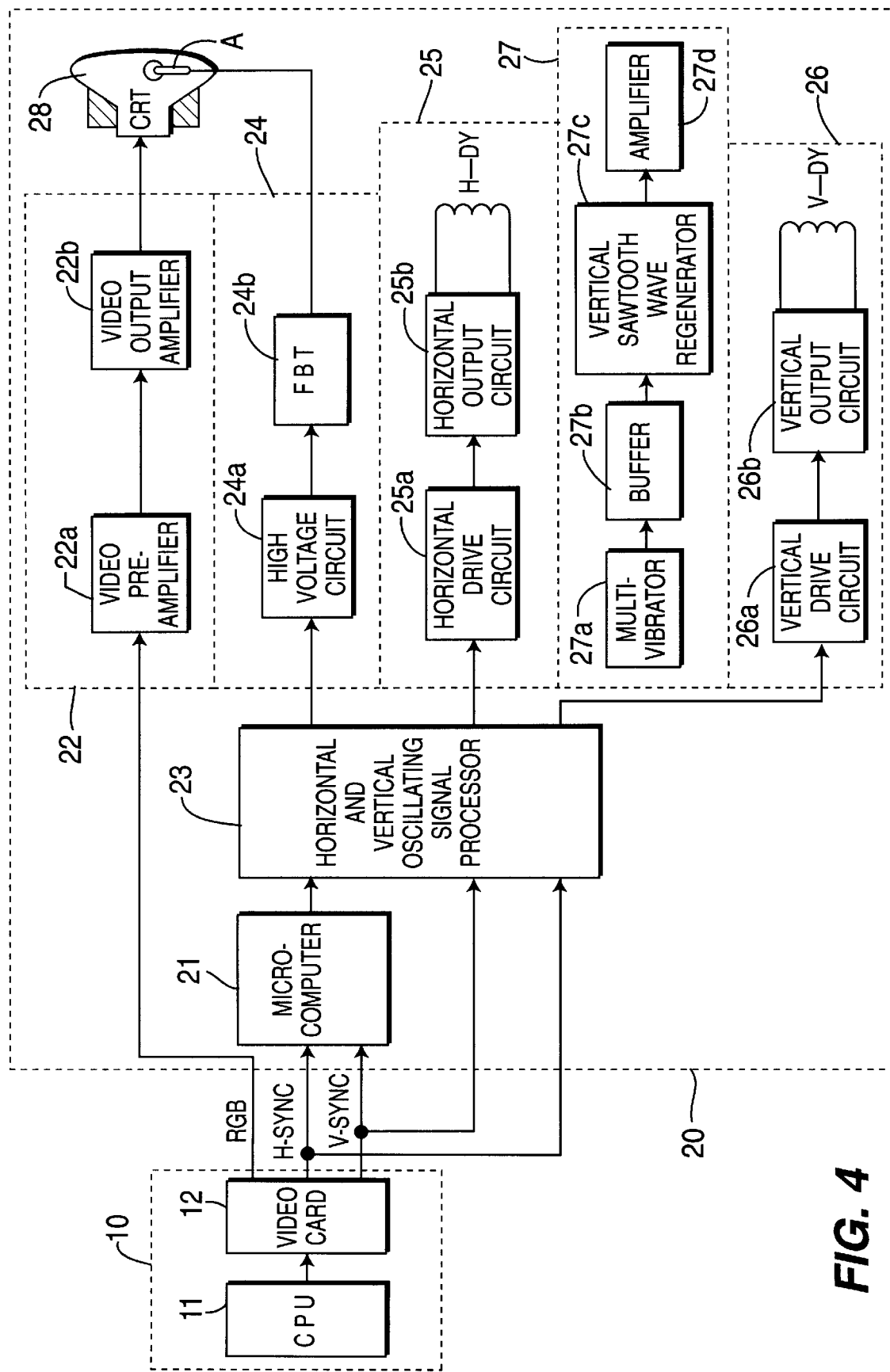
FIG. 4 is a block diagram of the circuit for correcting vertical distortion of the display device in accordance with the principles of the present invention.

FIG. 4 is a block diagram of a circuit for correcting vertical distortion of a display device in accordance with the present invention. As shown in FIG. 4, the circuit may be constructed with computer 10 including a CPU 11 for generating output data subsequent to the execution of a program, and a video card 12 for processing the output data of the CPU 10 into R, G and B video signals to generate horizontal and vertical sync signals H/V-Sync; a microcomputer 21 responsive to the horizontal and vertical sync signals H/V-SYNC generated by the video card 12, discriminating the resolution of the R, G and B video signals and generating a reference oscillating signal and OSD data according to the discriminated resolution; a video Pre-amplifier 22 for selectively boosting the R, G and B video signals received from the video card 12; a horizontal and vertical oscillating signal processor 23 for generating horizontal and vertical oscillating pulses in response to the reference oscillating signal generated by the microcomputer 21 and the horizontal and vertical sync signals H/V-SYNC from the video card 12; a high voltage circuit 24 for generating a high voltage in response to the oscillating pulses generated by the horizontal and vertical oscillating signal processor 23; a horizontal circuit 25 for generating a horizontal pulse current in response to the horizontal oscillating pulse generated by the horizontal and vertical oscillating signal processor 23; a vertical circuit 26 for generating a vertical pulse current in response to the vertical oscillating pulse generated from the horizontal and vertical oscillating signal processor 23; a vertical distortion correcting circuit 27 for overlapping the horizontal and vertical pulses generated by the horizontal and vertical circuits 25 and 26, respectively, in order to correct vertical distortion; and a CRT 28 for displaying the R, G and B video signals visually according to the period of the horizontal and vertical sawtooth currents generated by the horizontal and vertical circuits 25 and 26, forming an anodic surface A in response to receipt of high voltage generated by the high voltage circuit 24, and correcting vertical distortion in response to the correction signal generated by the vertical distortion correcting circuit 27.

The horizontal circuit 25 may be constructed with a horizontal drive circuit 25a for generating a drive current in response to the horizontal oscillating pulse generated by the horizontal and vertical oscillating signal processor 23; and a horizontal output circuit 25b for providing a horizontal sawtooth current to a horizontal deflection yoke H-DY in response to the drive current from the horizontal drive circuit 25a.

The vertical circuit 26 may be constructed with a vertical drive circuit 26a for generating a drive current in response to the vertical oscillating pulse generated by the horizontal and vertical oscillating signal processor 23; and a vertical output circuit 26b for providing a vertical sawtooth current to a vertical deflection yoke V-DY in response to the drive current from the vertical drive circuit 26a.

The vertical distortion correcting circuit 27, which is responsive to the horizontal and vertical pulses generated by the horizontal and vertical output circuits 25b and 26b, respectively, of the horizontal and vertical circuits 25 and 26, respectively, may be constructed with a multi-vibrator 27a for reducing by one-half the period of the horizontal pulse generated by the horizontal output circuit 25b and overlapping the horizontal pulse with the vertical pulse generated by the vertical output circuit 26b so as to generate a correction signal; a buffer 27b for stabilizing the correction signal generated by the multi-vibrator 27a; a vertical sawtooth wave regenerator 27c for regenerating a vertical sawtooth wave according to the stabilized correction signal from the buffer 27b; and an amplifier 27d for boosting the vertical sawtooth wave according to the correction signal received from the vertical sawtooth wave regenerator 27c, and applying it to the vertical deflection yoke V-DY.

A circuit with such a construction operates as follows. As the user executes a program through the computer 10, CPU 11 provides output data to the video card 12. The video card 12 processes the data, generating R, G and B video signals and horizontal and vertical sync signals H/V-SYNC for synchronizing the R, G and B video signals.

First, the R, G and B video signals generated by the video card 12 of the computer 10 are boosted to a limited level by video pre-amplifier 22a of the video amplifier 22, are further boosted through video output amplifier 22b, and finally are applied to the CRT 28. On the other hand, the horizontal and vertical sync signals H/V-SYNC generated by the video card 12 of the computer 10 are fed into the microcomputer 21 of display device 20. The microcomputer 21 discriminates the resolutions of the R, G and B video signals in response to the synchronizing signals. The microcomputer 21 generates a reference oscillation signal according to the resolution and applies it to the horizontal and vertical oscillating signal processor 23, which is receptive to the horizontal and vertical sync signals H/V-SYNC generated from the video card 12 of the computer 10. The horizontal and vertical oscillating signal processor 23 processes the reference oscillating signal and the horizontal and vertical sync signals H/V-SYNC, generating horizontal and vertical oscillating pulses. These horizontal and vertical oscillating pulses are fed into high voltage circuit 24a.

In response to the oscillating pulses, the high voltage circuit 24a provides drive current to an FBT 24b, which divides the voltage according to the drive current and supplies a high voltage to the anode A in the CRT 28. CRT 28 supplied with high voltage at the anode A forms an anodic surface, generating electron beams according to the R, G and B video signals boosted through the video output amplifier 22b.

Further, the horizontal and vertical oscillating pulses generated by the horizontal and vertical oscillating signal processor 23 are fed into the horizontal and vertical drive circuits 25a and 26a, respectively, of the horizontal and vertical circuits 25 and 26, respectively. The horizontal and vertical drive circuits 25a and 26a generate drive currents for the horizontal and vertical output circuits 25b and 26b in response to the horizontal and vertical oscillating pulses applied thereto.

Horizontal and vertical output circuits 25b and 26b, driven by the horizontal and vertical drive circuits 25a and 26a, respectively, provide horizontal and vertical sawtooth currents to the horizontal and vertical deflection yokes H/V-DY, respectively. According to the periods of the horizontal and vertical sawtooth currents generated from the horizontal and vertical deflection yokes H/V-DY, the CRT 28 deflects the R, G and B video signals generated from the video output amplifier 22b, creating an image. In order to prevent vertical distortion of the image caused by the geometrical structure of the CRT 28 with increased screen size, the horizontal and vertical pulses generated from the horizontal and vertical output circuits 25b and 26b, respectively, are fed into the multi-vibrator 27a of the vertical distortion correcting circuit 27. Multi-vibrator 27a overlaps the horizontal and vertical pulses and generates a correction signal. The horizontal pulse in this case may be a horizontal sync signal or a horizontal flyback signal. The correction signal generated by the multi-vibrator 27a is processed through the buffer 27b without variants of the gain and thereby stabilized. This stable correction signal is applied to the vertical sawtooth wave regenerator 27c to generate a vertical sawtooth current. The vertical sawtooth current is boosted again through the amplifier 27d and is applied to the vertical deflection yoke V-DY, correcting vertical distortion of the image.

Figure 5:
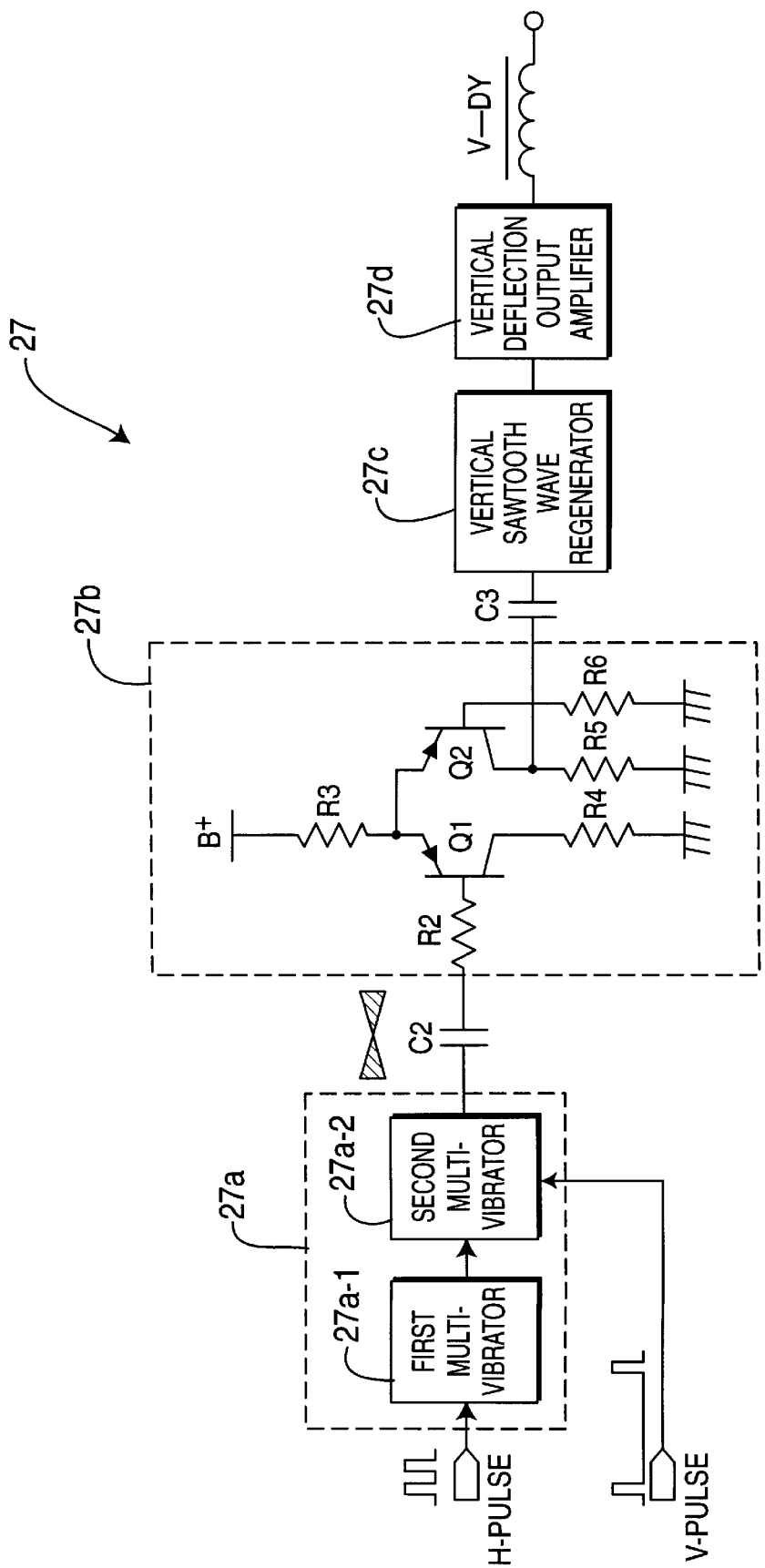
FIG. 5 is a detailed diagram of the circuit shown in FIG. 4.

Such a vertical distortion correcting circuit 27 will now be described in further detail with reference to FIG. 5. FIG. 5 is a detailed diagram of the vertical distortion correcting circuit 27 shown in FIG. 4. As shown in the figure, the circuit 27 is constructed with multi-vibrator 27a for overlapping the horizontal and vertical pulses H/V-PULSE received from the horizontal and vertical output circuits 25b and 26b, respectively, in FIG. 4 to generate a correction signal; vertical sawtooth wave regenerator 27c for regenerating a vertical sawtooth wave in response to the correction signal stabilized through buffer 27b; and amplifier 27d for boosting the vertical sawtooth wave according to the correction signal received from the vertical sawtooth wave regenerator 27c, and applying it to the vertical deflection yoke V-DY.

Multi-vibrator 27a is composed of a first multi-vibrator 27a-1 receptive to the horizontal pulse H-PULSE generated by the horizontal output circuit 25a to regulate the Duty of the waveform to a half period; and a second multi-vibrator 27a-2 for overlapping the horizontal pulse whose Duty has been regulated by the first multi-vibrator 27a-1 with the vertical pulse V-PULSE generated by the vertical output circuit 26b, generating a correction signal.

Buffer 27b for stabilizing the correction signal from the multi-vibrator 27a may be constructed with a first transistor Q1 which is turned on upon receipt of the correction signal at its base from the second multi-vibrator 27a-2; a second transistor Q2 receiving the correction signal at its emitter through the emitter of the transistor Q1 to generate the correction signal stabilized without variants of the gain; and a plurality of resistances R3 and R4.

Such a construction operates as follows. First, the horizontal pulse H-PULSE generated by the horizontal output circuit 25b is fed into the first multi-vibrator 27a-1, which regulates the Duty width of the horizontal pulse H-PULSE. That is, the first multi-vibrator 27a-1 reduces the Duty width of the horizontal pulse H-PULSE by half with monostable multi-vibrator 27a-1 which is used to reduce the period of the pulse by half. The duty width of the horizontal pulse H-PULSE regulated is, of course, dependent upon the RC time constant. Reduction of the period of the horizontal pulse by half results in correction of the image distortion which normally appears with the zenith in the center of the screen of the CRT 28 (shown in FIG. 4). The horizontal pulse, whose Duty width has been regulated through the first multi-vibrator 27a-1 and has a half period, is fed into the second multi-vibrator 27a-2, and the second multi-vibrator 27a-2 overlaps the horizontal pulse with the vertical pulse V-PULSE generated by the vertical output circuit 26b.

The second multi-vibrator 27a-2 in this case adds the vertical pulse to the horizontal pulse whose period has been reduced by half. That is, the horizontal pulse with the half period and the vertical pulse are processed into a correction signal in the form of the waveform "2" shown in the output of the second multi-vibrator 27a-2. This correction signal combines through coupling capacitor C2 and is applied to the base of the first transistor Q1 via the resistance R2 of the buffer 27b. Upon receipt of the correction signal via the resistance R2, the first transistor Q1 is driven by applying a d-c voltage B$^+$ to resistance R3.

The correction signal generated at the emitter of the first transistor Q1 when switched on is fed into the emitter of the second transistor Q2, which is then turned on. In this case, the ground voltage is always applied to the base of the second transistor Q2 through the resistance R6. The second transistor Q2, which has been provided with the correction signal at its emitter, is turned on, thereby generating the correction signal through load resistance R5 at its collector. The correction signal generated by turning on the first and second transistors Q1 and Q2, respectively, combines stably through coupling capacitor C3 without variance of the gain and is applied to the vertical sawtooth wave regenerator 27c.

Vertical sawtooth wave regenerator 27c, which has been provided with the correction signal generated through the buffer 27b consisting of the first and second transistors Q1 and Q2, generates a vertical sawtooth wave in response to the correction signal. Such a vertical sawtooth wave, as regenerated through the vertical sawtooth wave regenerator 27c according to the correction signal, is boosted by the amplifier 27d and is applied to the vertical deflection yoke V-DY. The vertical deflection yoke V-DY prevents a vertical distortion of the image on a large-sized screen in the display device 20 in response to the correction signal received from the amplifier 27d.

That is, the vertical deflection angle of the electron beams generated by the electron guns 5 (shown in FIG. 2) in the display device employing a large-sized screen is controlled with a minute current of the horizontal pulse to correct the vertical distortion of the image. The present invention is, of course, not specifically limited to the display device which is to display the video signals generated by the computer as exemplified above, and may be applicable to the horizontal and vertical circuits of the display device with a large-sized screen for displaying TV broadcast signals.

In the present invention described above, the vertical distortion of the image in the display device with a large-sized screen can be corrected making use of the low signal, minute current of the horizontal pulse.

It will be apparent to those skilled in the art that various modifications and variations can be made in the circuit for correcting the vertical distortion in a display device according to the present invention without departing from the spirit or scope of the invention. Thus, it is intended that the present invention cover the modifications and variations of this invention provided they come within the scope of the appended claims and their equivalents.

What is claimed is:

1. A circuit for correcting vertical distortion of a display device, comprising:
    multi-vibrator means for generating a correction signal by overlapping horizontal and vertical pulses provided by horizontal and vertical output circuits, respectively;
    buffer means for stabilizing the correction signal generated by the multi-vibrator means;
    vertical sawtooth wave regenerator means for regenerating a vertical sawtooth wave in response to the correction signal stabilized through the buffer means; and
    amplifier means for boosting the vertical sawtooth wave regenerated by the vertical sawtooth wave regenerator means, and for applying the boosted vertical sawtooth wave to a vertical deflection yoke.

2. The circuit as defined in claim 1, wherein the multi-vibrator means comprises:
    a first multi-vibrator for reducing by one-half a Duty of the horizontal pulse generated by the horizontal output circuit; and
    a second multi-vibrator for generating the correction signal by overlapping the horizontal pulse whose Duty has been reduced through the first multi-vibrator with the vertical pulse generated by the vertical output circuit.

3. The circuit as defined in claim 1, wherein the buffer means comprises:
    a first transistor having an emitter and driven in response to receipt of the correction signal generated by the multi-vibrator means for generating the correction signal at said emitter; and
    a second transistor having an emitter and receptive to the correction signal generated at the emitter of the first transistor, and generating the correction signal without variance of gain.

4. The circuit as defined in claim 3, further comprising a first resistor connected between said second multi-vibrator and a base of said first transistor, and a second resistor connected between an emitter of said first transistor and a voltage supply.

5. The circuit as defined in claim 4, further comprising a third resistor connected between the collector of said first transistor and ground, a fourth resistor connected between a collector of said second transistor and ground, and a fifth resistor connected between a base of said second transistor and ground.

6. The circuit as defined in claim 5, further comprising a capacitor connected between the collector of said second transistor and said vertical sawtooth wave regenerator means.

7. The circuit as defined in claim 4, further comprising a capacitor connected between the collector of said second transistor and said vertical sawtooth wave regenerator means.

8. The circuit as defined in claim 3, further comprising a capacitor connected between the collector of said second transistor and said vertical sawtooth wave regenerator means.

9. The circuit as defined in claim 3, further comprising a first resistor connected between the collector of said first transistor and ground, a second resistor connected between a collector of said second transistor and ground, and a third resistor connected between a base of said second transistor and ground.

10. The circuit as defined in claim 3, further comprising a capacitor connected between said second multi-vibrator and a base of said first transistor.

11. The circuit as defined in claim 2, further comprising a capacitor connected between said second multi-vibrator and said buffer means.

12. The circuit as defined in claim 2, further comprising a capacitor connected between said buffer means and said vertical sawtooth wave regenerator means.

13. The circuit as defined in claim 1, further comprising a capacitor connected between said multi-vibrator means and said buffer means.

14. The circuit as defined in claim 1, further comprising a capacitor connected between said buffer means and said vertical sawtooth wave regenerator means.

15. A circuit for correcting vertical distortion of a display device, comprising:
    multi-vibrator means for generating a correction signal by overlapping horizontal and vertical pulses provided by horizontal and vertical output circuits, respectively;
    buffer means for stabilizing the correction signal generated by the multi-vibrator means; and
    vertical sawtooth wave regenerator means for regenerating a vertical sawtooth wave in response to the correction signal stabilized through the buffer means.

16. The circuit as defined in claim 15, wherein the multi-vibrator means comprises:
    a first multi-vibrator for reducing by one-half a Duty of the horizontal pulse generated by the horizontal output circuit; and
    a second multi-vibrator for generating the correction signal by overlapping the horizontal pulse whose Duty has been reduced through the first multi-vibrator with the vertical pulse generated by the vertical output circuit.

17. The circuit as defined in claim 15, wherein the buffer means comprises:
    a first transistor having an emitter and driven in response to receipt of the correction signal generated by the multi-vibrator means for generating the correction signal at said emitter; and
    a second transistor having an emitter and receptive to the correction signal generated at the emitter of the first transistor, and generating the correction signal without variance of gain.

18. The circuit as defined in claim 17, further comprising a first resistor connected between said second multi-vibrator and a base of said first transistor, and a second resistor connected between an emitter of said first transistor and a voltage supply.

19. The circuit as defined in claim 18, further comprising a third resistor connected between the collector of said first transistor and ground, a fourth resistor connected between a collector of said second transistor and ground, and a fifth resistor connected between a base of said second transistor and ground.

20. The circuit as defined in claim 19, further comprising a capacitor connected between the collector of said second transistor and said vertical sawtooth wave regenerator means.

21. The circuit as defined in claim 18, further comprising a capacitor connected between the collector of said second transistor and said vertical sawtooth wave regenerator means.

22. The circuit as defined in claim 17, further comprising a capacitor connected between the collector of said second transistor and said vertical sawtooth wave regenerator means.

23. The circuit as defined in claim 17, further comprising a first resistor connected between the collector of said first transistor and ground, a second resistor connected between a collector of said second transistor and ground, and a third resistor connected between a base of said second transistor and ground.

24. The circuit as defined in claim 17, further comprising a capacitor connected between said second multi-vibrator and a base of said first transistor.

25. The circuit as defined in claim 16, further comprising a capacitor connected between said second multi-vibrator and said buffer means.

26. The circuit as defined in claim 16, further comprising a capacitor connected between said buffer means and said vertical sawtooth wave regenerator means.

27. The circuit as defined in claim 15, further comprising a capacitor connected between said multi-vibrator means and said buffer means.

28. The circuit as defined in claim 15, further comprising a capacitor connected between said buffer means and said vertical sawtooth wave regenerator means.

29. A circuit for correcting vertical distortion of a display device having horizontal and vertical output circuits, comprising:
   multi-vibrator means for generating a correction signal by overlapping horizontal and vertical pulses provided by said horizontal and vertical output circuits, respectively; and
   vertical sawtooth wave regenerator means for regenerating a vertical sawtooth wave in response to the correction signal generated by said multi-vibrator means.

30. The circuit as defined in claim 29, wherein said multi-vibrator means comprises:
   a first multi-vibrator for reducing by one-half a Duty of the horizontal pulse generated by the horizontal output circuit; and
   a second multi-vibrator for generating the correction signal by overlapping the horizontal pulse whose Duty has been reduced by one-half with the vertical pulse generated by the vertical output circuit.

31. The circuit as defined in claim 29, further comprising buffer means for stabilizing the correction signal generated by said multi-vibrator means.

32. The circuit as defined in claim 31, wherein the buffer means comprises:
   a first transistor having an emitter and driven in response to receipt of the correction signal generated by the multi-vibrator means for generating the correction signal at said emitter; and
   a second transistor having an emitter and receptive to the correction signal generated at the emitter of the first transistor, and generating the correction signal without variance of gain.

33. The circuit as defined in claim 32, further comprising a first resistor connected between said second multi-vibrator and a base of said first transistor, and a second resistor connected between an emitter of said first transistor and a voltage supply.

34. The circuit as defined in claim 33, further comprising a third resistor connected between the collector of said first transistor and ground, a fourth resistor connected between a collector of said second transistor and ground, and a fifth resistor connected between a base of said second transistor and ground.

35. The circuit as defined in claim 32, further comprising a capacitor connected between the collector of said second transistor and said vertical sawtooth wave regenerator means.

36. The circuit as defined in claim 34, further comprising a capacitor connected between the collector of said second transistor and said vertical sawtooth wave regenerator means.

37. The circuit as defined in claim 33, further comprising a capacitor connected between the collector of said second transistor and said vertical sawtooth wave regenerator means.

38. The circuit as defined in claim 32, further comprising a first resistor connected between the collector of said first transistor and ground, a second resistor connected between a collector of said second transistor and ground, and a third resistor connected between a base of said second transistor and ground.

39. The circuit as defined in claim 33, further comprising a capacitor connected between said second multi-vibrator and a base of said first transistor.

40. The circuit as defined in claim 31, further comprising a capacitor connected between said buffer means and said vertical sawtooth wave regenerator means.

41. The circuit as defined in claim 31, further comprising a capacitor connected between said multi-vibrator means and said buffer means.

42. The circuit as defined in claim 32, further comprising a capacitor connected between said buffer means and said vertical sawtooth wave regenerator means.

43. The circuit as defined in claim 31, further comprising a capacitor connected between said second multi-vibrator and said buffer means.

* * * * *